US008879867B2

(12) United States Patent
Tanaka et al.

(10) Patent No.: US 8,879,867 B2
(45) Date of Patent: Nov. 4, 2014

(54) PROCESSING SOURCE VIDEO FOR REAL-TIME ENHANCEMENT OF A SIGNAL OF INTEREST

(71) Applicant: Xerox Corporation, Norwalk, CT (US)

(72) Inventors: Takashi Tanaka, Urbana, IL (US); Lalit Keshav Mestha, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 136 days.

(21) Appl. No.: 13/745,283

(22) Filed: Jan. 18, 2013

(65) Prior Publication Data

US 2014/0205175 A1 Jul. 24, 2014

(51) Int. Cl.
*G06K 9/40* (2006.01)
*G06T 5/00* (2006.01)

(52) U.S. Cl.
CPC .................................... *G06T 5/007* (2013.01)
USPC ............................ 382/274; 345/589; 348/254

(58) Field of Classification Search
USPC ......... 382/100, 128–132, 162, 167, 254, 274;
128/922; 378/4–27; 250/205; 345/20,
345/63, 77, 581–618, 690–697; 348/251,
348/254; 358/461
See application file for complete search history.

(56) References Cited

U.S. PATENT DOCUMENTS

| 4,803,639 | A * | 2/1989 | Steele et al. ..................... 702/40 |
| 6,568,851 | B2 * | 5/2003 | Saito ............................. 378/207 |
| 6,658,082 | B2 * | 12/2003 | Okumura et al. ............... 378/19 |
| 7,003,076 | B2 * | 2/2006 | Okumura et al. ............ 378/98.8 |
| 7,544,163 | B2 * | 6/2009 | MacKinnon et al. ........ 600/178 |
| 8,396,315 | B2 * | 3/2013 | Brajovic ....................... 382/254 |
| 8,743,229 | B2 * | 6/2014 | Kim ............................. 348/222.1 |
| 2003/0198314 | A1 * | 10/2003 | Saito ................................. 378/4 |
| 2004/0071258 | A1 * | 4/2004 | Okumura et al. ............... 378/19 |
| 2010/0277498 | A1 * | 11/2010 | Elliott et al. ................... 345/589 |

OTHER PUBLICATIONS

Liu et al., "Method and Systems for Vascular Pattern Localization Using Temporal Features", U.S. Appl. No. 13/710,974.
Mestha et al., "Removing Environment Factors From Signals Generated From Video Images Captured for Biomedical Measurements", U.S. Appl. No. 13/401,207, filed Feb. 21, 2012.
Xu et al., "Monitoring Respiration With a Thermal Imaging System", U.S. Appl. No. 13/103,406, filed May 9, 2011.

(Continued)

*Primary Examiner* — Anand Bhatnagar
(74) *Attorney, Agent, or Firm* — Philip E. Blair; Fleit Gibbons Gutman Bongini & Bianco P.L.

(57) ABSTRACT

What is disclosed is a system and method for real-time enhancement of an identified time-series signal of interest in a video that has a similar spatial and temporal structure to a given reference signal, as determined by a measure of closeness. A closeness measure is computed for pixels of each image frame of each channel of a multi-channel video to identify a time-series signal of interest. The intensity of pixels associated with that time-series signal is modified based on a product of the closeness measure and the reference signal scaled by an amplification factor. The modified pixel intensity values are provided back into the source video to generate a reconstructed video such that, upon playback of the reconstructed video, viewers thereof can visually examine the amplified time-series signal, see how it is distributed and how it propagates. The methods disclosed find their uses in remote sensing applications such as telemedicine.

22 Claims, 4 Drawing Sheets

(56) References Cited

OTHER PUBLICATIONS

Xu et al., "Subcutaneous Vein Pattern Detection Via Multi-Spectral IR Imaging in an Identity Verification System", U.S. Appl. No. 13/087,850, filed Apr. 15, 2011.

Mestha et al., "Deriving Arterial Pulse Transit Time From a Source Video Image", U.S. Appl. No. 13/401,286, filed Feb. 21, 2012.

Mestha, et al., "Estimating Cardiac Pulse Recovery From Multi-Channel Source Data Via Constrained Source Separation", U.S. Appl. No. 13/247,683, filed Sep. 28, 2011.

Mestha et al., "Systems and Methods for Non-Contact Heart Rate Sensing", U.S. Appl. No. 13/247,575, filed Sep. 28, 2011.

Mestha et al., "Video-Based Estimation of Heart Rate Variability", U.S. Appl. No. 13/532,057, filed Jun. 25, 2012.

Cardoso et al., "Minimally Invasive Image-Based Determination of Carbon Dioxide (CO2) Concentration in Exhaled Breath", U.S. Appl. No. 13/246,560, filed Sep. 27, 2011.

Mestha et al., "Processing a Video for Respiration Rate Estimation", U.S. Appl. No. 13/529,648, filed Jun. 21, 2012.

Mestha et al., "Processing a Video for Vascular Pattern Detection and Cardiac Function Analysis", U.S. Appl. No. 13/483,992, filed May 30, 2012.

Bernal et al., "Processing a Video for Tidal Chest Volume Estimation", U.S. Appl. No. 13/486,637, filed Jun. 1, 2012.

Kyal et al., "Continuous Cardiac Pulse Rate Estimation From Multi-Channel Source Video Data", U.S. Appl. No. 13/528,307, filed Jun. 20, 2012.

Mestha et al., "Filtering Source Video Data Via Independent Component Selection", U.S. Appl. No. 13/281,975, filed Nov. 8, 2011.

Xu et al., "A Multi-Layer Array for a Multi-Resolution Multi-Spectral Camera," U.S. Appl. No. 13/239,642 filed Sep. 22, 2011.

Wang et al., "Multi-Band Infrared Camera System Optimized for Skin Detection", U.S. Appl. No. 13/416,436, filed Mar. 9, 2012.

* cited by examiner

PROCESSING SOURCE VIDEO FOR REAL-TIME ENHANCEMENT OF A SIGNAL OF INTEREST

TECHNICAL FIELD

The present invention is directed to systems and methods for processing source video to identify a time-series signal of interest within that video and modifying pixels associated with the identified signal such that the signal is visually enhanced upon video playback.

BACKGROUND

In medical practice, visual enhancement of color changes appearing on skin tissue can greatly aid medical practitioners in their diagnosis of underlying medical conditions such as peripheral neuropathy, for example. Methods for enhancing various aspects of images in this regard are highly desirable by diagnosticians.

Previous methods, such as that which is disclosed in "Filtering Source Video Data Via Independent Component Selection", U.S. patent application Ser. No. 13/281,975, by Mestha et al., projected the source video onto a lower dimensional subspace and performed independent component analysis on the projected data to identify signal components of interest which were then used to reconstruct the video. However, such approaches do not work on a real-time basis since the algorithms performing Independent Component Analysis (ICA) are statistically-based methods which require large amounts of data and are computationally intensive. Adding to the problem is that signals of interest are often quite weak. For example, the amplitude of a cardiac pulse signal appearing on a facial region in the RGB channels is typically less than a single unit of a 0-255 color scale. Due to such a small signal-to-noise ratio (SNR), it can be difficult to detect a desired signal of interest appearing in local pixels directly from local signals. On the other hand, SNR can be improved by applying spatial filters, such as mean filters over large areas, but it still can be difficult to identify the source of a signal in low resolution images obtained by simply averaging, as in the ICA approach. What is desirable is to, not only enhancement of a signal of interest in video data, but also to ameliorate the SNR deficiency.

Accordingly, what is needed in this art is a system and method for processing source video to identify a time-series signal contained within that source video data and modify the intensity value of pixels in the image frames of that video which are associated with that signal such that, upon playback, the signal is visually enhanced.

INCORPORATED REFERENCES

The following U.S. patents, U.S. patent applications, and Publications are incorporated herein in their entirety by reference.

"Method And Systems For Vascular Pattern Localization Using Temporal Features", U.S. patent application Ser. No. 13/710,974, by Liu et al, discloses a method for localizing vascular pattern using temporal features from video.

"Removing Environment Factors From Signals Generated From Video Images Captured For Biomedical Measurements", U.S. patent application Ser. No. 13/401,207, by Mestha et al. which discloses a system and method for analyzing a video such that undesirable periodic signals and random background noise can be removed.

"Monitoring Respiration With A Thermal Imaging System", U.S. patent application Ser. No. 13/103,406, by Xu et al., which discloses a system and method for analyzing a video such that the respiration rate of a subject of interest in that video can be determined.

"Subcutaneous Vein Pattern Detection Via Multi-Spectral IR Imaging In An Identity Verification System", U.S. patent application Ser. No. 13/087,850, by Xu et al. which discloses a method for identifying an individual in an IR video by isolating and extracting a subcutaneous vein pattern in an area of skin from that video.

"Deriving Arterial Pulse Transit Time From A Source Video Image", U.S. patent application Ser. No. 13/401,286, by Mestha et al., which discloses a method for analyzing a video such that a pulse transit time can be determined for a person in that video.

"Estimating Cardiac Pulse Recovery From Multi-Channel Source Data Via Constrained Source Separation", U.S. patent application Ser. No. 13/247,683 which discloses a system and method for recovering an estimated cardiac pulse rate from a sequence of RGB or multi-spectral video image data captured from the facial/skin region of a person or animal being monitored for cardiac function in a remote sensing environment.

"Systems And Methods For Non-Contact Heart Rate Sensing", U.S. patent application Ser. No. 13/247,575, by Mestha et al., which discloses a system and method for analyzing a video of a subject of interest to determine the subject's heart rate.

"Video-Based Estimation Of Heart Rate Variability", U.S. patent application Ser. No. 13/532,057, by Mestha et al., which discloses a system and method for estimating heart rate variability from video captured of a patient being monitored for cardiac function.

"Minimally Invasive Image-Based Determination Of Carbon Dioxide ($CO_2$) Concentration In Exhaled Breath", U.S. patent application Ser. No. 13/246,560, by Cardoso et al., which discloses a system and method for analyzing a video such that a concentration of carbon dioxide ($CO_2$) in a person's exhaled breath can be determined.

"Processing A Video For Respiration Rate Estimation", U.S. patent application Ser. No. 13/529,648, by Mestha et al., which discloses a system and method for estimating a respiration rate for a subject of interest captured in a video containing a view of that subject's thoracic region.

"Processing A Video For Vascular Pattern Detection And Cardiac Function Analysis", U.S. patent application Ser. No. 13/483,992, by Mestha et al. which discloses a method for analyzing a video to identify a vascular pattern in a region of interest and then processing the pixels associated with the identified vascular pattern to determine various aspects of a subject's cardiac function.

"Processing A Video For Tidal Chest Volume Estimation", U.S. patent application Ser. No. 13/486,637, by Bernal et al., which discloses a system and method for estimating tidal chest volume by analyzing distortions in reflections of structured illumination patterns captured in a video containing a partial view of a thoracic region of a subject of interest being monitored for respiratory function.

"Continuous Cardiac Pulse Rate Estimation From Multi-Channel Source Video Data", U.S. patent application Ser. No. 13/528,307, by Kyal et al., which discloses a system and method for continuously estimating cardiac pulse rate from multi-channel source video captured of a patient being monitored for cardiac function.

"Filtering Source Video Data Via Independent Component Selection", U.S. patent application Ser. No. 13/281,975, by Mestha et al. which discloses a system and method for reconstructing source video data captured using a video camera such that certain information in the source data is visually emphasized during video playback.

"A Multi-Filter Array For A Multi-Resolution Multi-Spectral Camera", U.S. patent application Ser. No. 13/239,642, by Xu et al., which discloses a multi-filter array for a multi-resolution and multi-spectral camera system for simultaneous spectral decomposition with a spatially and spectrally optimized multi-filter array suitable for image object identification.

"Multi-Band Infrared Camera System Optimized For Skin Detection", U.S. patent application Ser. No. 13/416,436, by Wang et al. which discloses a method for determining an optimal wavelength band combination for filters of an infrared camera used for acquiring infrared images containing skin tissue.

BRIEF SUMMARY

What is disclosed is a system and method for real-time enhancement of an identified time-series signal of interest in a video that has a similar spatial and temporal structure to a given reference signal, as determined by a measure of closeness. A closeness measure is computed for pixels of each image frame of each channel of a multi-channel video to identify a time-series signal of interest. The intensity of pixels associated with that time-series signal is modified based on a product of the closeness measure and the reference signal scaled by an amplification factor. The modified pixel intensity values are provided back into the source video to generate a reconstructed video such that, upon playback of the reconstructed video, viewers thereof can visually examine the amplified time-series signal, see how it is distributed and how it propagates. The teachings hereof can be implemented in real-time as image frames of video are captured on a per-channel basis. The present system and method effectively enables real-time enhancement of an identified time-series signal of interest during video acquisition. The methods disclosed find their uses in a wide array of remote sensing applications including the telemedicine arts.

One embodiment of the present method for real-time enhancement of a source video signal involves the following. First, source video is acquired by a multi-channel video acquisition system over multiple channels. For each pixel location (i, j) of each channel k of the multi-channel source video signal, a measure of closeness is calculated and used, in conjunction with a reference signal R(t), to identify a time-series signal I(t) of interest where $I_{ijk}(t)$ is the signal that appears at pixel location (i, j, k) in the video. Embodiments of a closeness measure are disclosed. Intensity of pixels associated with the identified time-series signal is modified, in a manner disclosed herein in detail, to produce modified video data. The modified video data is retrofitted back into the source video to generate a reconstructed video. The reconstructed video is communicated, in real-time, to a display device for viewing.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
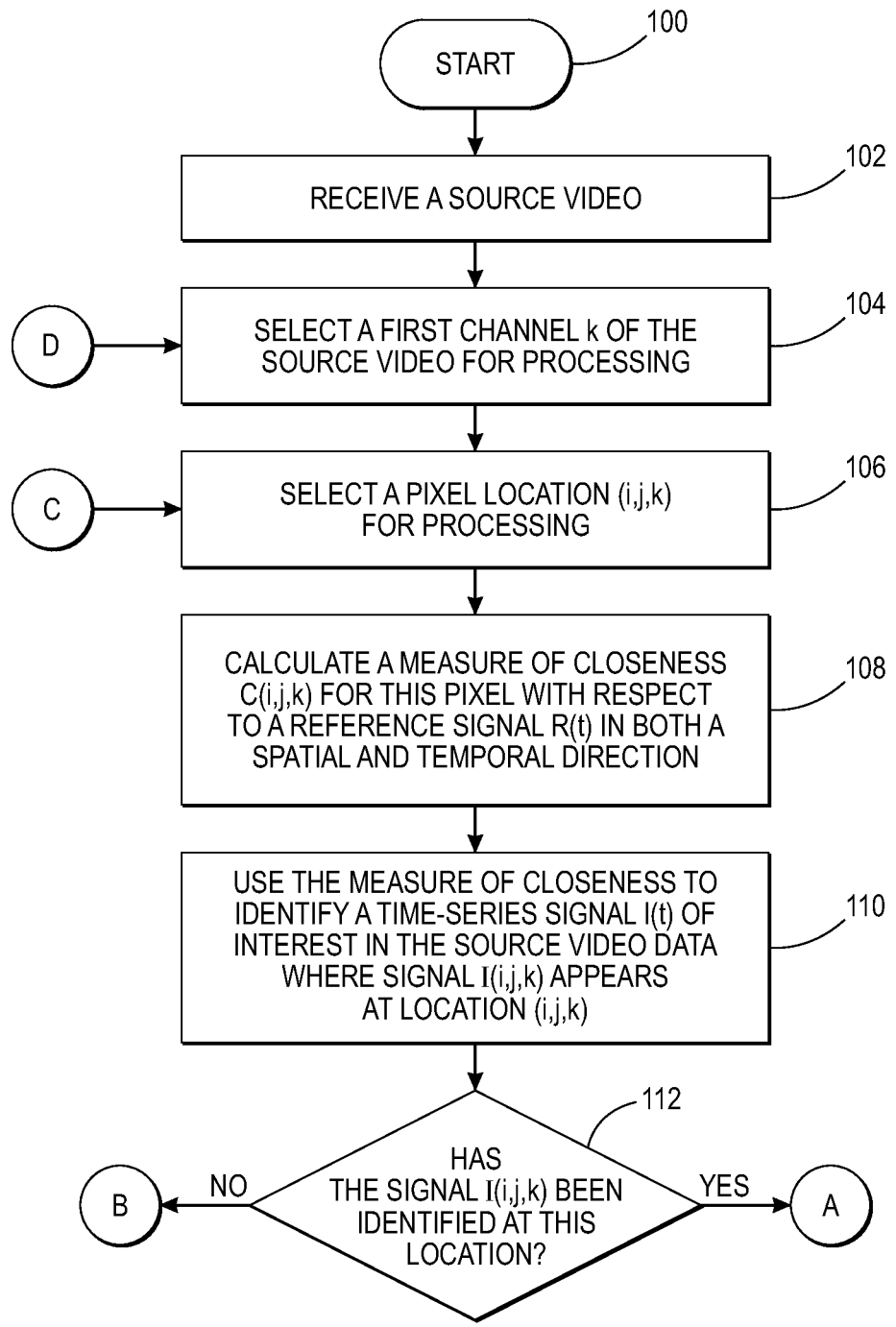
FIG. 1 is a flow diagram of one example embodiment of the present method for real-time enhancement and visualization of source video.

What is disclosed is a system and method for processing source video to identify a time-series signal contained within that source video data and modify the intensity value of pixels in the image frames of that video associated with that signal such that, upon playback, the signal is visually enhanced. The teachings disclosed herein enable users to see the enhanced signal, and see how it is distributed and how it propagates.

Non-Limiting Definitions

"Source video" refers to a time varying video signal acquired over C channels where k=1 . . . C, using a multi-channel video acquisition system as defined herein. The acquired video signal comprises a plurality of image frames. Each frame of the video is a 2D array of pixels with each pixel location (i, j, k) in the video having an intensity $I_{ijk}$ that corresponds to an amount of detected reflected energy projected by an illumination source over a wavelength range of interest.

"Receiving source video" is intended to be widely construed and means to retrieve, capture with a video camera, acquire, or otherwise obtain a source video for processing in accordance with the present method. The source video can be retrieved from a memory or storage device which may be internal to the video acquisition system, or obtained from a remote device over a network or from a website. The video data may also be retrieved from a removable media such as, for example, a CDROM, DVD, USB Drive or a memory card.

A "multi-channel video acquisition system" is a device for acquiring a source video signal $V^{H \times W}$ over C channels where each image frame has a size H×W, where H is the height of an image frame in pixels and W is the width of the image frame in pixels. In one embodiment, the multi-channel video acquisition system is a device with a high frame rate and high spatial resolution such as, for example, a monochrome video camera for capturing black/white video images, or a color video camera for capturing color video images. The multi-channel video acquisition system may comprise a multi-spectral or hyperspectral video camera. Such spectral sensing device have relatively low frame rates and low spatial resolution but high spectral resolution. The video system may be a hybrid device capable of operating in dual modes, i.e., a conventional video mode with high frame rate and high spatial resolution, and a spectral mode with high spectral resolution. Multi-channel video acquisition systems comprising standard video cameras and those devices with spectral sensors are readily available from different vendors in various streams of commerce. Multi-channel video devices typically have a plurality of outputs from which the acquired source video can be received on a per-channel basis. Video systems may further comprise one or more processors capable of executing machine readable program instructions and may further comprise a video analysis module for analyzing and reconstructing the source video in real-time, in accordance with the teachings hereof.

A "video analysis module", in one embodiment, comprises at least one processor executing machine readable program instructions for analyzing video images such that the video can be reconstructed and communicated to a display device. A video analysis module may comprise, in whole or in part, a software application working alone or in conjunction with hardware resources such as, for example, a dedicated processor or ASIC. Aspects of a video analysis module may leverage off-the-shelf software.

A "time-series signal of interest" is a signal I(t) within the source video which contains meaningful data which is desired to be visually enhanced using the methods disclosed herein. Signal $I_{ijk}(t)$ appears at pixel location (i, j, k) in the video. A signal of interest may be, for example, a subject's cardiac pulse, their respiration rate, blood flow, $CO_2$ concentration, or perspiration rate. The signal of interest may be a detectable brainwave signal and may further include physical motion such as eye blinks, twitches, ticks, and the like. The time-series signal of interest is identified in the source video using a measure of closeness determined with respect to a reference signal in both a spatial and time direction.

A "reference signal" is a signal used to facilitate the identification of a time-series signal of interest in the source video. For example, in those embodiments where the subject's cardiac pulse frequency is the time-series signal of interest intended to be enhanced in the source video, the reference signal R(t) would be a signal which has a frequency range which approximates the frequency range of the subject's cardiac pulse frequency. A reference signal can be an EKG signal, an ECG signal, or a photoplethysmographic (PPG) signal obtained using non-invasive electro-optic techniques which sense cardiovascular pulse waves (also referred to as "blood volume pulse") through variations in transmitted or reflected light. EKG, ECG, PPG signals and the like, provide valuable information about various autonomic functions. The reference signal can be any signal acquired or generated using any of a variety of systems, devices, methods, or techniques such as, for instance, a Blind Source Separation (BSS) technique which recovers unobserved source signals from a set of observed mixed signals without any prior information being known about the "mixing" process. The reference signal may be modified with respect to a frequency, amplitude, phase or waveform as needed, depending on the implementation and the nature of the time-series signal of interest intended to be identified in the source video for enhancement. The reference signal may be received in real-time from a sensing device capable of generating a reference signal as output. The reference signal may be derived, generated or otherwise obtained beforehand, stored to a memory or storage device, and subsequently retrieved when needed. The reference signal facilitates the identification of a time-series signal of interest in the source video using a measure of closeness.

A "measure of closeness", or "closeness measure" is calculated for each pixel (i, j) of each channel k of the source video and used to determine how close a given signal at a pixel location is with respect to a reference signal. The closeness measure effectively identifies the time-series signal of interest in the source video. One embodiment of the measure of closeness is defined by the following relationship:

$$C_{ijk}(t+1) = \beta C_{ijk}(t) + (I_{ijk}(t) - \bar{I}_{ijk}(t))(R(t) - \bar{R}(t))$$

$$\bar{I}_{ijk}(t+1) = \alpha \bar{I}_{ijk}(t) + (1-\alpha)I_{ijk}(t),$$

$$\bar{R}(t+1) = \alpha \bar{R}(t) + (1-\alpha)R(t), \quad (1)$$

where $0 < \beta < 1$, $0 < \alpha < 1$. In Eq. (1), $\bar{I}_{ijk}(t)$ and $\bar{R}(t)$ approximate moving averages of video signals $I_{ijk}(t)$ and reference signal R(t). After mean-removal, the empirical correlation between $I_{ijk}(t) - \bar{I}_{ijk}(t)$ and $R(t) - \bar{R}(t)$ is calculated (as shown in Eq. (1)) to evaluate the degree of "similarity" between these signals. In various embodiments, this is done in an online fashion.

In those embodiments where the video signal is expected to contain a similar feature to the reference signal with time lags, one can prepare a set of candidate time lags $\tau_l$, where l=1, 2, ..., m, and m is a user-specified number of shifts. For each time lag $\tau_l$, the measure of closeness between video signal $I_{ijk}(t)$ and the time-shifted reference signal $R(t-\tau_l)$ is given by:

$$C_{ijk}^{\tau_l}(t+1) = \beta C_{ijk}^{\tau_l}(t) + (I_{ijk}(t) - \bar{I}_{ijk}(t))(R(t-\tau_l) - \bar{R}(t-\tau_l))$$

$$\bar{I}_{ijk}(t+1) = \alpha \bar{I}_{ijk}(t) + (1-\alpha)I_{ijk}(t),$$

$$\bar{R}(t+1) = \alpha \bar{R}(t) + (1-\alpha)R(t), \quad (2)$$

"Modifying video data" means modifying intensity values of pixels in the source video which are associated with the identified time-series signal of interest. In those embodiments where the measure of closeness is defined by the relationship of Eq. (1), the modification applied to pixel location (i, j, k) which is associated with identified signal $I_{ijk}(t)$ is given by:

$$J_{ijk}(t) = I_{ijk}(t) + \delta C_{ijk}(t)R(t). \quad (3)$$

where $\delta$ is a user-defined amplification factor.

In the embodiment of the closeness measure of Eq. (2) where the reference signal has been shifted by a pre-defined shift $\tau_l$, the modification applied to pixel location (i, j, k) is given by:

$$J_{ijk}(t) = I_{ijk}(t) + \delta \sum_{l=1}^{m} C_{ijk}^{\tau_l}(t) R(t - \tau_l). \quad (4)$$

The introduction of multiple lags in Eq. (2) and Eq. (4) is intended to reveal spatio-temporal structure of the signal of interest. While the visual effect obtained by (3) only captures and amplifies the signal of interest appearing in the video without any time lag, (4) also captures and amplifies the signal of interest appearing in the video with some time lags. This visualizes dynamic propagation of the featured signal and allows more vivid video reconstruction.

"Retrofitting" the modified video data back into the source video means to replace the pixel value at location (i, j, k) with the value $J_{ijk}(t)$. Such a replacement, performed on a pixel by pixel, channel by channel basis, effectively generates a reconstructed source video.

A "reconstructed source video" means intensity values of pixels associated with the identified time-series signal of interest in the source video have been replaced with the modified video data such that, upon playback, certain pixel locations in each image frame of each channel of the multi-channel source video have been visually enhanced. The reconstructed source video is communicated to a display device.

"Communicating the reconstructed video" is intended to be widely construed and means to send, transmit, deliver, otherwise provide the reconstructed source video to a display device.

A "display device" refers to any device capable of receiving the reconstructed source video and storing that video for eventual display. Display devices, as are generally understood, include LCD, HD, CRT, and touchscreen displays. Such devices have specialized video processors and circuitry which operate in conjunction with specialized memory such as, for instance, raster memory. A size of the raster memory depends on the resolution of the display device. When the image to be visually displayed is stored in the raster memory, the specialized video processing circuitry reads the data stored in those raster memory locations for visual presentation.

Flow Diagram of One Embodiment

Reference is now being made to the flow diagram of FIG. 1 which illustrates a flow diagram of one example embodiment of the present method for real-time enhancement of a signal of interest in a video. Flow processing begins at 100 and immediately proceeds to step 102.

At step 102, receive a source video for processing. The received source video contains a time-series signal of interest which is intended to be identified and enhanced. The source video comprises a plurality of image frames with each frame comprising an array of pixels. Each pixel has an intensity value corresponding to detected reflected energy projected by an illumination source over a wavelength range of interest. The source video is acquired using a multi-channel video acquisition system with C channels, where channel index k=1 . . . C.

At step 104, select a first channel k of the multi-channel source video for reconstruction. Such a selection can be effectuated using, for example, a graphical user interface such as that which is shown and described with respect to the embodiment of FIG. 3. The channels can be individually selected for processing or processed according to a pre-set or pre-programmed sequential method.

At step 106, select a first pixel location (i, j, k) for processing. Pixel of each image frame of the selected channel of the source video can be processed using, for instance, a row/column iterative selection method which steps through each pixel location of each image frame of the channel selected at step 104. Example image frames are shown at 302 of FIG. 3.

In some embodiments, the pixel location (i, j, k) can be selected for processing only along the vascular pattern. Vascular patterns may be identified using techniques disclosed in At step 108, calculate, for the selected pixel location, a measure of closeness with respect to a reference signal R(t). Embodiments for different closeness measures are described with respect to Eqs. (1) and (2). Such a calculation is performed by a processor executing machine readable program instructions for calculating a closeness measure for a given pixel location.

At step 110, use the measure of closeness to identify a time-series signal I(t) of interest in the received source video. If the closeness measure is within a pre-defined threshold then the signal at that location is determined to be "close" enough to qualify for enhancement.

At step 112, a determination is made whether a time-series signal of interest has been identified at this pixel location (i, j, k). If so, then processing continues with respect to node A of FIG. 2. If not, then processing continues with respect node B.

Figure 2:
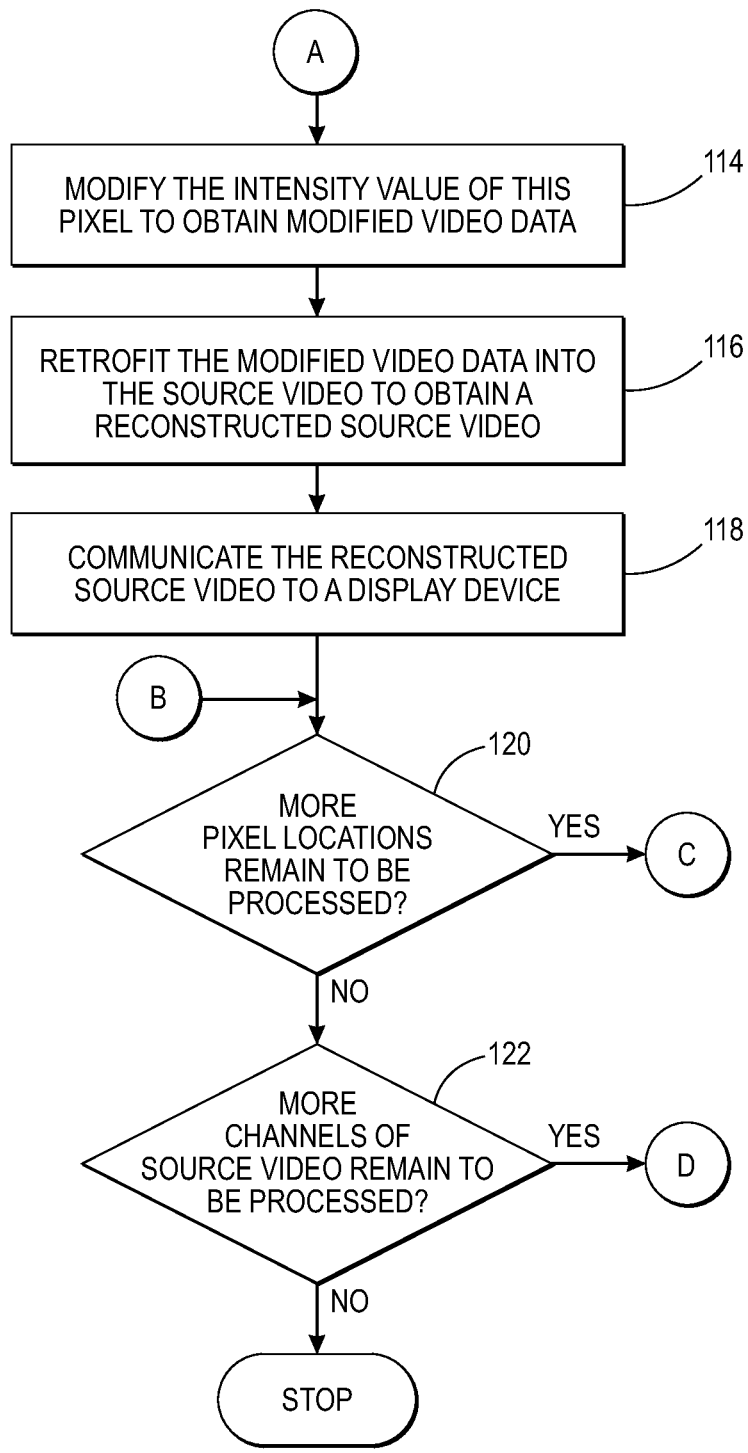
FIG. 2 is a continuation of the flow diagram of FIG. 1 with flow processing continuing with respect to either node A or B.

Reference is now being made to the flow diagram of FIG. 2 which is a continuation of the flow diagram of FIG. 1 with flow processing continuing with respect to either node A or node B.

At step 114, modify an intensity of the pixel at this location to generate modified video data. Embodiments for $J_{ijk}(t)$ are described in Eqs. (3) and (4), depending on the closeness measure used in step 108. The modified video data may be stored to a memory or storage device for subsequent retrieval.

At step 116, retrofit the modified video data into the source video to obtain a reconstructed source video. Retrofitting effectively replaces the intensity value of the pixel at this location in the source video with value of the modified video data (of step 114).

At step 118, communicate the reconstructed source video to a display device. Thereafter, processing continues with respect to step 120.

If, as a result of the determination of step 112 of FIG. 1, the time-series signal of interest has not been identified at this pixel location the processing continues with respect to node B of FIG. 2 wherein, at step 120, a determination is made whether any more pixels remain to be processed. If so, then processing continues with respect to node C of FIG. 1 wherein, at step 106, a next pixel location is selected for processing. Processing then repeats in a similar manner with respect to the next selected pixel location until all desired pixels have been selected for processing. If, at step 120, no more pixels remain to be processed in any of the image frames of this channel of source video then processing continues with respect to step 122 wherein a determination is made whether any more channels of source video remain to be selected. If more channels of video data remain to be processed then processing repeats with respect to node D wherein, at step 104 wherein a next channel of source video is selected or otherwise identified for processing. Processing repeats for all pixel locations of all image frames for this next selected channel until all desired channels of the multi-channel source video have been processed. Thereafter, in this embodiment, further processing stops.

In the embodiment of FIGS. 1 and 2, the step of communicating is performed as the modified video data is retrofitted into the source video as a result of the determination of step 112. It should be appreciated that the step of communicating may be performed at various processing intervals with the reconstructed video being stored to a memory or storage device, at least temporarily, and subsequently retrieved as needed or as the available amount of memory or storage falls below a defined limit. In other embodiments, the reconstructed source video is communicated upon completion of processing all the pixel locations of a given image frame of source video, or after having processed all the frames of a given channel. In yet other embodiments, the modified video data is stored and retrieved and retrofitted into the source video to generate the reconstructed video as that data begins to accumulate in memory, and the reconstructed video thereafter is communicated to the display device. Such embodiments are intended to fall within the scope of the appended claims. Various aspects of the methods disclosed herein are intended to be performed with a degree of parallelism with respect to other steps hereof.

It should also be appreciated that the flow diagrams hereof are illustrative. One or more of the operative steps may be performed in a differing order. Other operations, for example, may be added, modified, enhanced, integrated, or consolidated. Such variations are intended to fall within the scope of the appended claims. All or portions of the flow diagrams may be implemented partially or fully in hardware operating in conjunction software.

Block Diagram Of Video Processing System

Figure 3:
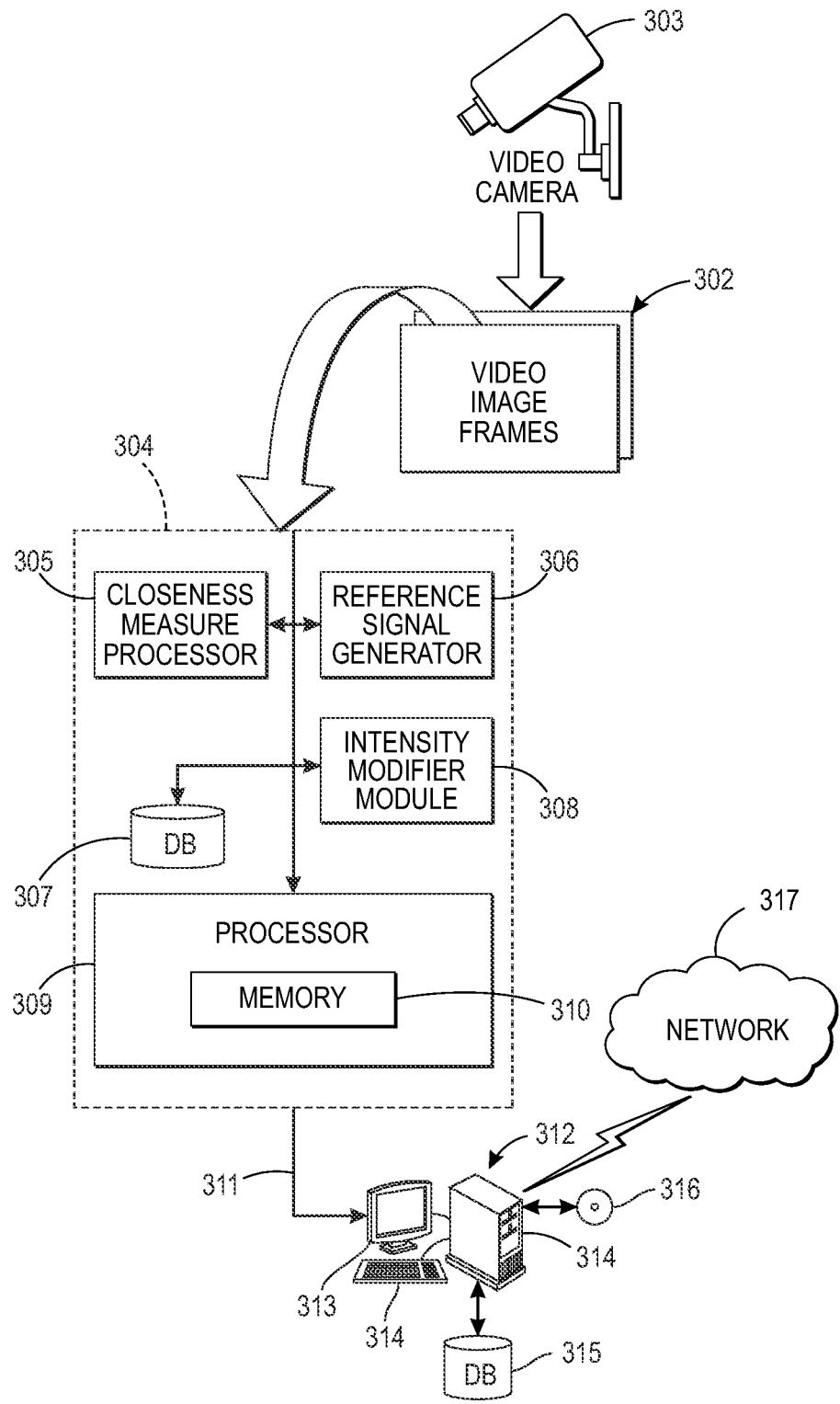
FIG. 3 illustrates a block diagram of one embodiment of a video processing system for performing real-time enhancement of a signal of interest in a source video as described with respect to the flow diagrams of FIGS. 1 and 2.

Reference is now being made to FIG. 3 which illustrates a block diagram of one embodiment of a system for performing real-time enhancement of a signal of interest in a source video as described with respect to the flow diagrams of FIGS. 1 and 2.

In FIG. 3, the source video, shown as a plurality of image frames 302, is captured using a multi-channel video acquisition system 303. The acquired source video 302 is provided to video processing system 304 which, in this embodiment, is shown comprising a plurality of modules and processing units. Closeness Measure Processor 305 receives the acquired source video 302, and determines, on a per-frame per-channel basis, a measure of closeness with respect to a reference signal R(t) obtained from Reference Signal Generator 306 such that a time-series signal of interest I(t) can be identified. The reference signal and various mathematical formulas and variables, and the like, are retrieved on an as-needed basis from storage device 307. Once the time-series signal of interest has been identified, Intensity Modifier Module 308 modifies the intensity values of pixels associated with the identified signal to generate, as output, modified video data. The modified video data is stored to storage device 307. Moreover, various mathematical formulas and variables are retrieved by Module 308 from storage device 307 to perform its intended function. Module 308 further retrofits the modified video data into the source video to generate a reconstructed source video. Processor 309, which has its own memory 310, is utilized by any of the modules of the video processing system 304 to facilitate processing and communication between the various modules and with storage device 307. Processor 309 communicates (at 311) the reconstructed source video to workstation 312 for display. The workstation is shown generally comprising a display device 313 for displaying the reconstructed source video. The workstation further effectuates a user input or selection such as, for example, the a selection as to a channel of video or pixel locations of image frames to process. Display device 313 may be placed in communication with any of the modules and processors of the video processing system 304 and/or the multi-channel video acquisition system 303 such that images processed thereby can be viewed in real-time. A user or technician of the system of FIG. 3 may use the graphical user interface of workstation 312, e.g., keyboard 314 and mouse (not shown), to set parameters enter values, select pixels, channels, and/or regions of images for processing, and to determine which device is to receive the communicated reconstructed source video. In one embodiment, the user uses a slideably selectable bar to set the amplification factor δ such that the amount of visual enhancement is made adjustable in real-time. Values entered and selections made may be stored to storage medium 315 or to computer readable media 316. It should be appreciated that some or all of the functionality performed by any of the modules or processing units of the video processing system of FIG. Information stored to a computer readable media can be retrieved by a media reader such as, for example, a CD-ROM or DVD drive. Workstation 312 is shown having been placed in communication with network 317 via a communications interface (not shown).

It should be appreciated that the workstation of FIG. 3 has an operating system and other specialized software configured to display a variety of numeric values, text, scroll bars, pull-down menus with user selectable options, and the like, for entering, selecting, or modifying information displayed thereon. Any of the modules and processing units of FIG. 3 can be placed in communication with display device 313 and database 315 and may store/retrieve therefrom data, variables, records, parameters, functions, mathematical representations, and any machine readable program instructions as required to perform their intended functions. Any of the modules and processing units of system of FIG. 3 may be placed in communication with one or more devices over network 317.

Various modules may designate one or more components which may, in turn, comprise software and/or hardware designed to perform their intended functions. A plurality of modules may collectively perform a single function. Each module may have a specialized processor therein for executing machine readable program instructions. A module may comprise a single piece of hardware such as an ASIC, electronic circuit, or special purpose computer such as that which is shown and discussed with respect to FIG. 4. A plurality of modules may be executed by either a single special purpose computer or a plurality of special purpose computer systems operating in parallel. Connections between modules include both physical and logical connections. Modules may further include one or more software/hardware modules which may comprise an operating system, drivers, device controllers, and other apparatuses some or all of which may be connected via a network.

Example Special Purpose Computer

Figure 4:
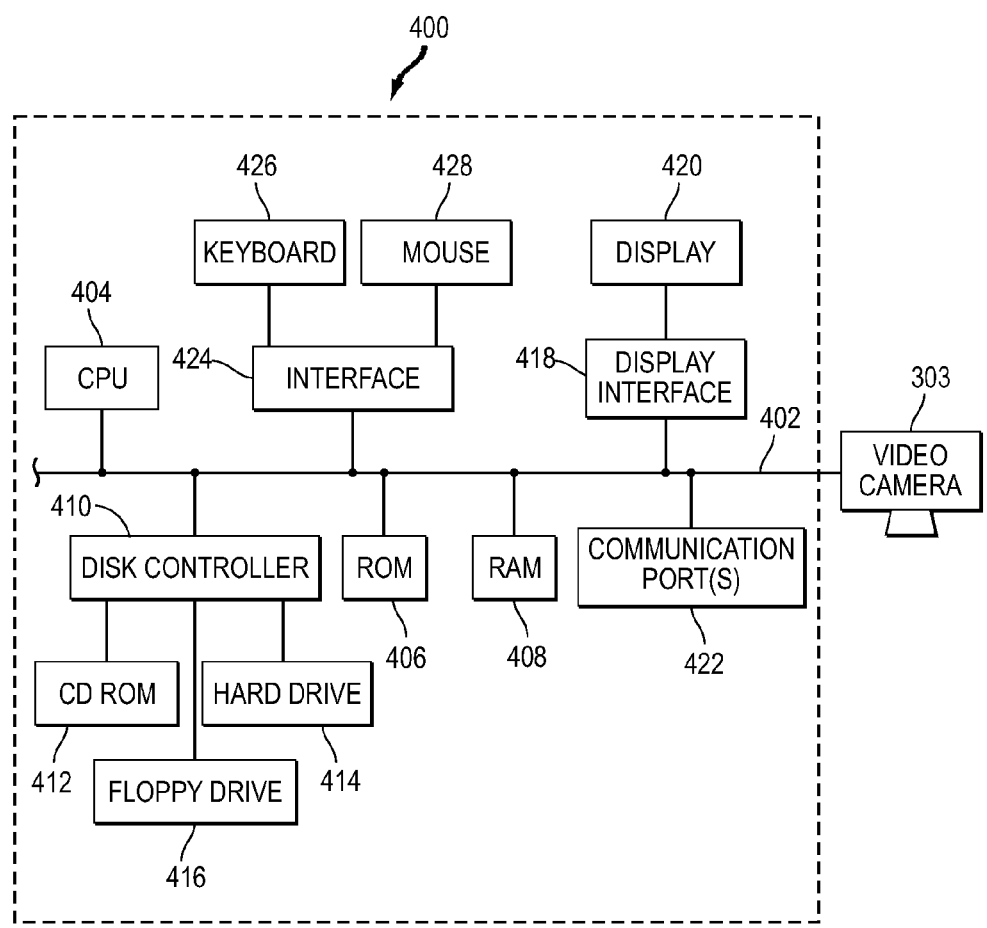
FIG. 4 illustrates a block diagram of one example special purpose computer for implementing one or more aspects of the present method as described with respect to the flow diagrams of FIGS. 1 and 2 and the block diagram of FIG. 3.

Reference is now being made to FIG. 4 which illustrates a block diagram of one example special purpose computer 400 for implementing one or more aspects of the present method as described with respect to the flow diagrams of FIGS. 1 and 2 and the block diagram of FIG. 3. Such a special purpose processor is capable of executing machine executable program instructions and may comprise any of a micro-processor, micro-controller, ASIC, electronic circuit, or any combination thereof.

In FIG. 4, communications bus 402 is in communication with a central processing unit (CPU) 404 capable of executing machine readable program instructions for performing any of the calculations, comparisons, logical operations, and other program instructions for performing any of the steps described above with respect to the flow diagrams and illustrated embodiments hereof. Processor 404 is in communication with memory (ROM) 406 and memory (RAM) 408 which collectively constitute example storage devices. Such memory may be used to store machine readable program instructions and other program data and results to sufficient to carry out any of the functionality described herein. Disk controller 410 interfaces with one or more storage devices 414 which may comprise external memory, zip drives, flash memory, USB drives, or other devices such as CD-ROM drive 412 and floppy drive 416. Storage device stores machine executable program instructions for executing the methods hereof. Such storage devices may be used to implement a database wherein various records are stored. Display interface 418 effectuates the display of information on display device 420 in various formats such as, for instance, audio, graphic, text, and the like. Interface 424 effectuates a communication via keyboard 426 and mouse 428, collectively a graphical user interface. Such a graphical user interface is useful for a user to enter information about any of the displayed information in accordance with various embodiments hereof. Communication with external devices may occur using example communication port(s) 422. One such external device placed in communication with the special purpose computer system of FIG. 4 is the spectral multi-channel video camera 303 of FIG. 3. Such ports may be placed in communication with any of the modules and components of the example networked configuration of FIG. 3, as shown and described herein, using the Internet or an intranet, either by direct (wired) link or wireless link. Example communication ports include modems, network cards such as an Ethernet card, routers, a PCMCIA slot and card, USB ports, and the like, capable of transferring data from one device to another. Software and data is transferred via the communication ports in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, or the like. The teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on a storage device readable by a machine architecture embodying executable program instructions capable of performing the methodologies described herein. The article of manufacture may be included as part of a standalone system, an operating system, or a software package which may be shipped, sold, leased, or otherwise provided either alone or as part of an add-on, update, upgrade, or product suite. It will be appreciated that various features and functions and alternatives hereof may be combined into other systems or applications which are heretofore unknown.

Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Changes to the above-described embodiments may be made without departing from the spirit and scope of the invention. The teachings of any printed publications including patents and patent applications, are each separately hereby incorporated by reference in their entirety.

What is claimed is:

1. A method for real-time enhancement of a signal of interest in a video, the method comprising:
    receiving a source video acquired using a multi-channel video acquisition system with C channels where channel k=1 ... C, said source video comprising a plurality of image frames, each frame comprising an array of pixels, each pixel having an intensity value corresponding to detected reflected energy projected by an illumination source over a wavelength range of interest;
    for each pixel location (i, j) of each image frame of each channel k of said source video:
        determining a measure of closeness with respect to a reference signal R(t) in both a spatial and time direction;
        identifying, using said measure of closeness, a time-series signal I(t) of interest in said source video, where signal $I_{ijk}(t)$ appears at pixel location (i, j, k);
        in response to having identified said time-series signal of interest at pixel location (i, j, k):
            modifying an intensity of said pixel at said location to generate modified video data $J_{ijk}(t)$; and
            retrofitting said modified video data into said source video to generate a reconstructed source video; and
    communicating said reconstructed source video to a display device.

2. The method of claim 1, wherein said multi-channel video acquisition system comprises any combination of: a monochrome video camera, a color video camera, a multi-spectral camera, a hyper-spectral camera, and a hybrid device.

3. The method of claim 1, wherein said measure of closeness at pixel location (i, j, k) comprises:

$$C_{ijk}(t+1)=\beta C_{ijk}(t)+(I_{ijk}(t)-\bar{I}_{ijk}(t))(R(t)-\bar{R}(t)),$$

$$\bar{I}_{ijk}(t+1)=\alpha \bar{I}_{ijk}(t)+(1-\alpha)I_{ijk}(t),$$

$$\bar{R}(t+1)=\alpha \bar{R}(t)+(1-\alpha)R(t),$$

where $0<\beta<1$, and $0<\alpha<1$.

4. The method of claim 3, wherein said modification at pixel location (i, j, k) comprises:

$$J_{ijk}(t)=I_{ijk}(t)+\delta C_{ijk}(t)R(t).$$

5. The method of claim 1, further comprising shifting said reference signal by a pre-specified shift $\tau_l$, where l=1, 2, ..., m, and m is a user-specified number of shifts.

6. The method of claim 5, wherein said measure of closeness at pixel location (i, j, k) comprises:

$$C_{ijk}^{\tau_l}(t+1)=\beta C_{ijk}^{\tau_l}(t)+(I_{ijk}(t)-\bar{I}_{ijk}(t))(R(t-\tau_l)-\bar{R}(t-\tau_l)),$$

$$\bar{I}_{ijk}(t+1)=\alpha \bar{I}_{ijk}(t)+(1-\alpha)I_{ijk}(t),$$

$$\bar{R}(t+1)=\alpha \bar{R}(t)+(1-\alpha)R(t),$$

where $0<\beta<1$, and $0<\alpha<1$.

7. The method of claim 6, wherein said modification at pixel location (i, j, k) comprises:

$$J_{ijk}(t) = I_{ijk}(t) + \delta \sum_{l=1}^{m} C_{ijk}^{\tau_l}(t)R(t-\tau_l).$$

8. The method of claim 1, wherein said reference signal is extracted from said source video.

9. The method of claim 1, wherein said time-series signal is a signal of a subject's cardiac pulse, and wherein said reference signal is a signal which has a frequency range that approximates a frequency range of said subject's cardiac pulse.

10. The method of claim 1, further comprising using said reconstructed source video to facilitate a determination of any of: a cardiac signal, respiratory rate and function, $CO_2$ concentration in exhaled breath, perspiration, brainwave pattern and signals, degree of infection, blood flow and circulation, and a bodily motion.

11. The method of claim 1, wherein said pixel location (i, j) of each image frame of each channel k of said source video is along a vascular pattern.

12. A system for real-time enhancement of a signal of interest in a video, the system comprising:
  a multi-channel video acquisition system for acquiring source video with C channels, where channel k=1 ... C; and
  a processor in communication with a memory and said multi-channel video acquisition system, said processor executing machine readable instructions for performing:
    receiving a source video acquired using said multi-channel video acquisition system, said source video comprising a plurality of image frames, each frame comprising an array of pixels, each pixel having an intensity value corresponding to detected reflected energy projected by an illumination source over a wavelength range of interest;
    for each pixel location (i, j) of each image frame of each channel k of said source video:
      determining a measure of closeness with respect to a reference signal R(t) in both a spatial and time direction;
      identifying, using said measure of closeness, a time-series signal I(t) of interest in said source video, where signal $I_{ijk}(t)$ appears at pixel location (i, j, k); and
      in response to having identified said time-series signal of interest at pixel location (i, j, k):
        modifying an intensity of said pixel at said location to generate modified video data $J_{ijk}(t)$; and
        retrofitting said modified video data into said source video to generate a reconstructed source video; and
    communicating said reconstructed source video to a display device.

13. The system of claim 12, wherein said multi-channel video acquisition system comprises any combination of: a monochrome video camera, a color video camera, a multi-spectral camera, a hyper-spectral camera, and a hybrid device.

14. The system of claim 12, wherein said measure of closeness at pixel location (i, j, k) comprises:

$C_{ijk}(t+1)=\beta C_{ijk}(t)+(I_{ijk}(t)-\bar{I}_{ijk}(t))(R(t)-\bar{R}(t))$, $\bar{I}_{ijk}(t+1)=\alpha \bar{I}_{ijk}(t)+(1-\alpha)I_{ijk}(t)$, $\bar{R}(t+1)=\alpha\bar{R}(t)+(1-\alpha)R(t)$, where $0<\beta<1$, and $0<\alpha<1$.

15. The system of claim 14, wherein said modification at pixel location (i, j, k) comprises:

$J_{ijk}(t)=I_{ijk}(t)+\delta C_{ijk}(t)R(t)$.

16. The system of claim 12, further comprising shifting said reference signal by a pre-specified shift $\tau_l$, where l=1, 2, ..., m, and m is a user-specified number of shifts.

17. The system of claim 16, wherein said measure of closeness at pixel location (i, j, k) comprises:

$C_{ijk}^{\tau_l}(t+1)=\beta C_{ijk}^{\tau_l}(t)+(I_{ijk}(t)-\bar{I}_{ijk}(t))(R(t-\tau_l)-\bar{R}(t-\tau_l))$, $\bar{I}_{ijk}(t+1)=\alpha \bar{I}_{ijk}(t)+(1-\alpha)I_{ijk}(t)$, $\bar{R}(t+1)=\alpha\bar{R}(t)+(1-\alpha)R(t)$, where $0<\beta<1$, and $0<\alpha<1$.

18. The system of claim 17, wherein said modification at pixel location (i, j, k) comprises:

$$J_{ijk}(t) = I_{ijk}(t) + \delta \sum_{l=1}^{m} C_{ijk}^{\tau_l}(t)R(t-\tau_l).$$

19. The system of claim 12, wherein said reference signal is extracted from said source video.

20. The system of claim 12, wherein said time-series signal is a signal of a subject's cardiac pulse, and wherein said reference signal is a signal which has a frequency range that approximates a frequency range of said subject's cardiac pulse.

21. The system of claim 12, further comprising using said reconstructed source video to facilitate a determination of any of: a cardiac signal, respiratory rate and function, $CO_2$ concentration in exhaled breath, perspiration, brainwave pattern and signals, degree of infection, blood flow and circulation, and a bodily motion.

22. The system of claim 12, wherein said pixel location (i, j) of each image frame of each channel k of said source video is along a vascular pattern.

* * * * *